United States Patent [19]

Reedy et al.

[11] 4,141,535
[45] Feb. 27, 1979

[54] BOTTOM OPERABLE TANK CAR VALVE ASSEMBLY HAVING SHEAR PLANE

[75] Inventors: Charles E. Reedy, Bridgeton; Edwin S. Carlson, St. Charles, both of Mo.

[73] Assignee: ACF Industries, Incorporated, New York, N.Y.

[21] Appl. No.: 804,663

[22] Filed: Jun. 8, 1977

Related U.S. Application Data

[60] Continuation-in-part of Ser. No. 700,105, Jan. 28, 1976, abandoned, which is a division of Ser. No. 513,082, Oct. 8, 1974, Pat. No. 3,981,481.

[51] Int. Cl.$^2$ .............................................. F16K 1/48
[52] U.S. Cl. .................................... 251/144; 251/291; 137/544; 137/797
[58] Field of Search ............... 251/144, 291, 292, 293, 251/266, 268, 269, 267; 137/797, 544; 285/2

[56] References Cited

U.S. PATENT DOCUMENTS

| | | | |
|---|---|---|---|
| 1,278,813 | 9/1918 | Weaver | 251/144 |
| 1,650,406 | 11/1927 | Welcker | 137/797 X |
| 2,092,926 | 9/1937 | Lithgow | 251/144 X |
| 2,139,280 | 12/1938 | McBride | 251/144 X |
| 2,190,723 | 2/1940 | McBride | 251/144 X |
| 2,638,924 | 5/1953 | St. Clair | 137/797 X |
| 3,219,054 | 11/1965 | Elder et al. | 251/267 |
| 3,439,938 | 4/1969 | Dunton | 137/797 X |
| 3,586,019 | 6/1971 | Thomas et al. | 251/268 X |
| 3,591,131 | 8/1971 | Carlson | 251/144 |
| 3,656,710 | 4/1972 | Shaw | 251/144 |

FOREIGN PATENT DOCUMENTS 1336176 7/1973 France .................................. 251/144

*Primary Examiner*—William R. Cline
*Attorney, Agent, or Firm*—Henry W. Cummings

[57] ABSTRACT

A bottom operable lading valve assembly for tank cars includes a valve closure plug movable between open and closed positions relative to a circular plug seat located within a valve body opening. A housing is affixed to the valve body with fasteners comprising a shear plane. The housing includes a generally vertical housing opening into which a rotatable valve operator is mounted comprising a lower tool connection portion, a shaft portion and an upper operating portion. The upper operating portion includes upper operator threads which engage an operating stem depending from the closure plug. The upper operating portion and the valve stem terminate on or above the shear plane. The valve operator shaft portion separates below the shear plane in the event impact causes the housing to shear off along the shear plane to maintain the upper operating portion, valve stem and closure plug in seated position to prevent escape of lading. During rotation of the valve operator in a direction to move the closure plug to open position, the closure plug wipes the plug seat. Further rotation of the valve operator causes the plug to move vertically toward open position without rotation. Rotation of the valve operator from open position causes the plug to move vertically downwardly to a closed and seated position without rotation. A screen may be provided extending up into the tank from the valve body to protect the valve assembly from objects located inside the tank.

19 Claims, 18 Drawing Figures

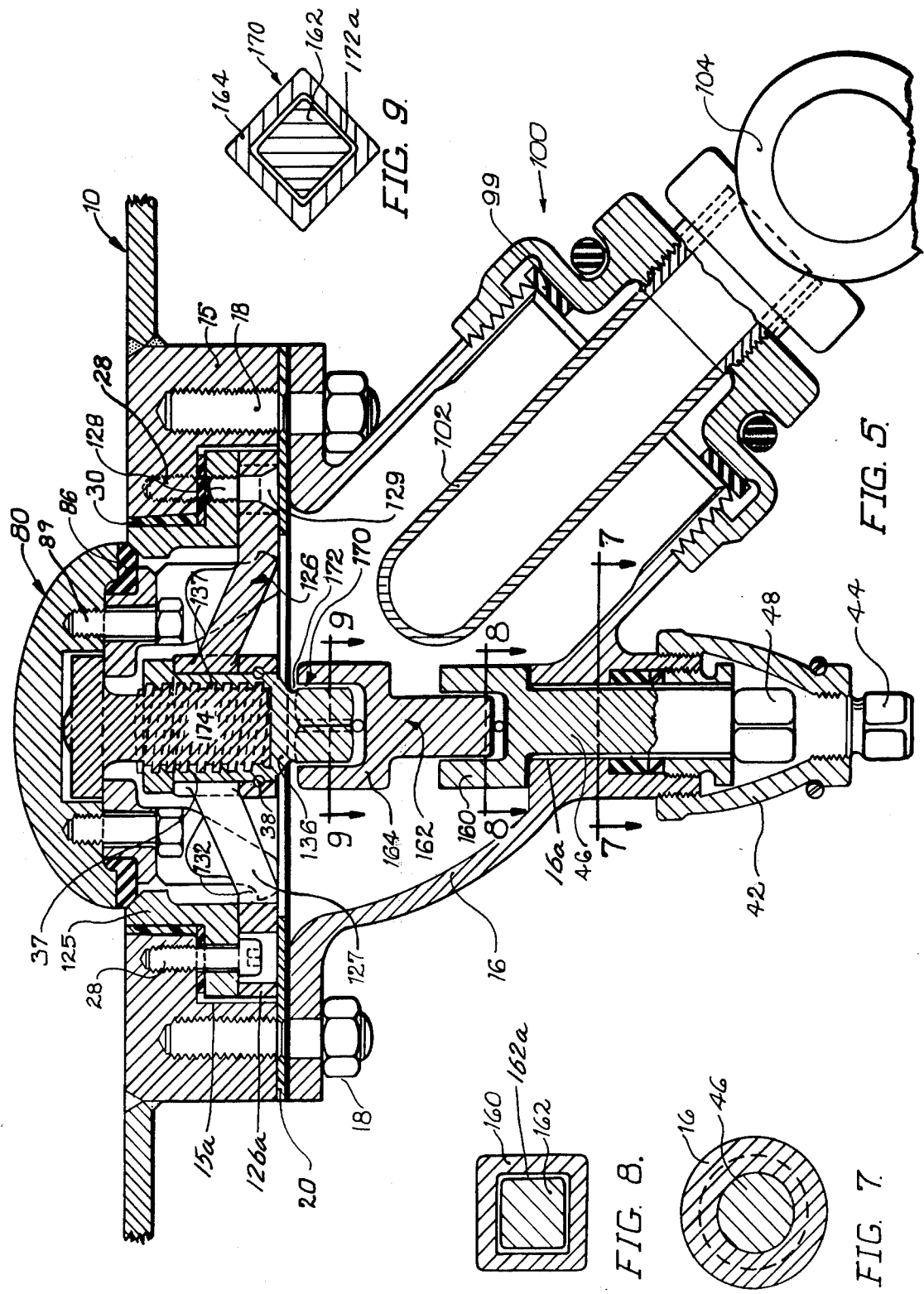

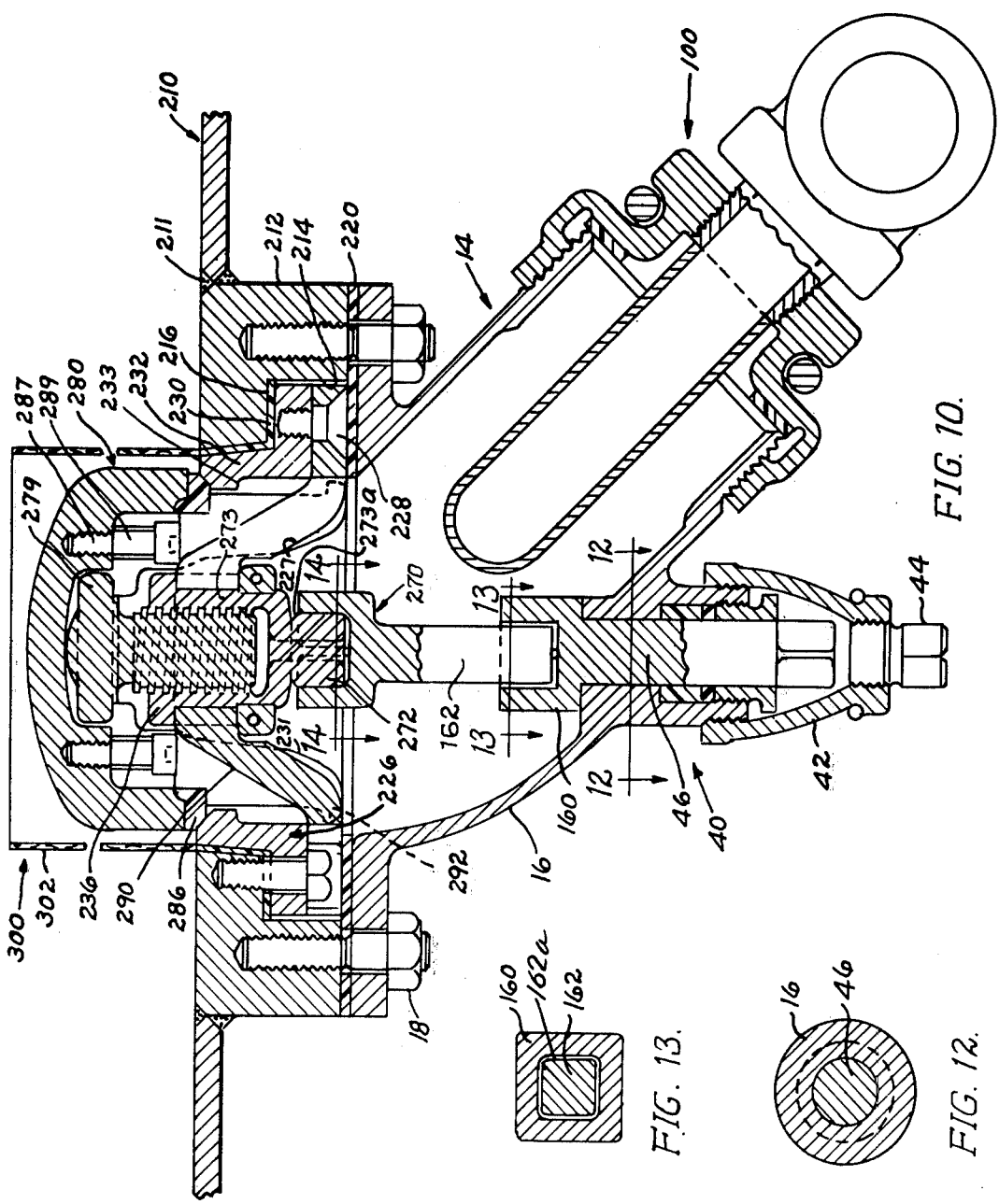

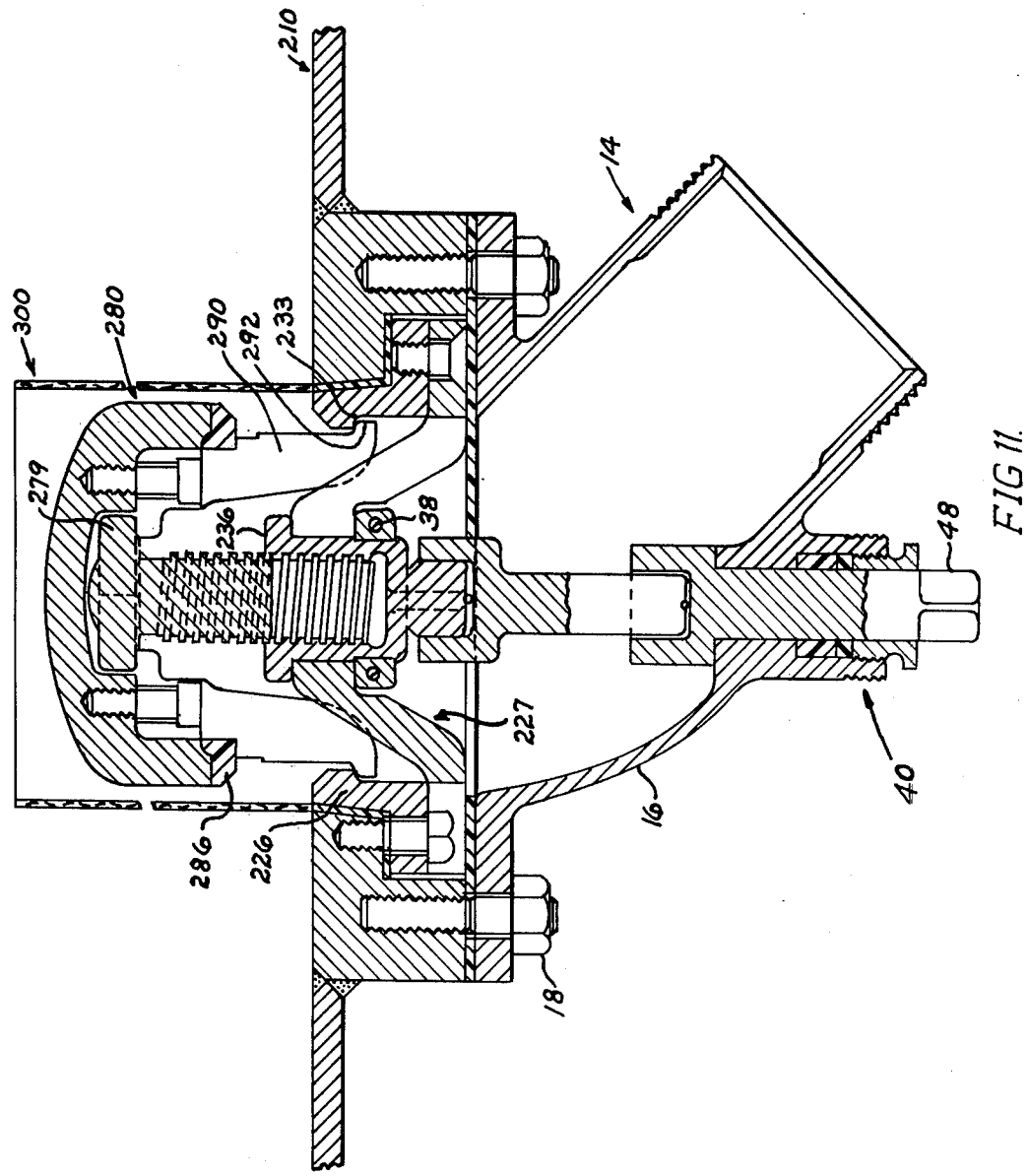

BOTTOM OPERABLE TANK CAR VALVE ASSEMBLY HAVING SHEAR PLANE

REFERENCE TO RELATED APPLICATION

This application is a continuation-in-part of application Ser. No. 700,105 filed Jan. 28, 1976, now abandoned which is a divisional application of Ser. No. 513,082 filed Oct. 8, 1974, now U.S. Pat. No. 3,981,481 granted Sept. 12, 1976.

BACKGROUND OF THE INVENTION

This invention relates to a bottom operable lading loading and unloading valve assembly for a railway tank car. For the most part tank car lading valves have been operable from the top manway of the tank. However, this is disadvantageous because of the danger of the operator falling off the car during loading or unloading. Furthermore, if the valve assembly is in some way defective or inoperative, or if the valve assembly requires cleaning, the operator must do so from the inside of the car. The lading must be removed from the car for this to take place. Working on the valve assembly inside of the car is often an expensive maintenance operation for the tank car owner or lessee, and there is some danger to the operator working inside the car.

Currently, the problem of derailments suggests that it would be preferable for the outlet mechanism to shear off upon impact rather than punch or tear a hole in the tank bottom. Therefore it is desired that there be readily shearable planes in the valve assembly which will shear off in the event of impact to the valve assembly. Furthermore, to the extent that the vertical operator will shear off below the tank a skid is not required. Avoidance of a skid reduces the cost and weight of the car.

It is particularly important, for example, during derailments to be able to replace a defective lower valve plug operating mechanism while the tank contains lading and the plug portion of the valve remains in place to prevent the lading from escaping.

Furthermore, leakage is always a problem and it is desired to provide a valve assembly design which will provide positive sealing to provide assurance against leakage.

One bottom outlet is disclosed in U.S. Pat. No. 1,565,913 (1925). In this patent a valve outlet assembly is riveted to the tank with rivets 16. A transverse operator 29 is utilized to move a valve member 24 into and out of engagement with a seat formed on cylindrical threaded housing 18. Operator 29 is rotatable, but is prevented from longitudinal movement. A stop 32 is provided which the valve engages in the full open position.

This patent requires a large outlet housing attached to lower portion of the tank, and includes a pair of valve assemblies to unload the car from opposite sides of the track.

Ball valves have been provided on tank cars which are operable from the bottom exterior of the tank. See, for example, U.S. Pat. Nos. 3,227,101 (1966); 3,591,131 (1971) and 3,661,355 (1972). These ball valves are quite expensive and it is desired to obtain a design which is less expensive than a ball valve.

Angle valves have also been utilized in tank cars. See, for example, page 3, 5 and 7 of the catalog REGO, RAILROAD TANK CAR VALVES, 4201 West Peterson Avenue, Chicago, Illinois. Copyright 1970, Rego Divison of Golconda Corporation. Angle valves utilizing a handwheel and a vertically extending threaded shaft cooperate with threads on the fixed housing to move the valve member between an open and closed positions. However, even if such an angle valve were reversed and used as an outlet valve (and there is no suggestion to do so) there is no teaching of the operating mechanism of the outlet shearing off under impact.

This same catalog on page 11 discloses a bottom operated discharge valve which is vertically movable within a strainer 4 and a housing 6 guides the vertical movement. A handle 20B is connected to an operating shaft 15B which is in turn connected to a cam lever arm assembly 16B which raises and lowers the valve without rotation. See also U.S. Pat. No. 3,199,534.

In Melott U.S. Pat. No. 2,002,672 (1935) a valve member 32 is provided with a stop 83 to limit travel of the valve in open position.

U.S. Pat. No. 2,567,426 discloses a wine bung screw valve including an external groove in the valve housing and rotatable and vertically movable operator to move a valve plug between open and closed positions.

In U.S. Pat. No. 2,072,271 (1937) a vertically movable safety valve utilizes guide members 32 to maintain basically vertical movement of the valve head B and prevent the same from being cocked during the vertical movement. However, this is a safety valve movable between open and closed positions against the bias of a spring by pressure from a pressure chamber. It has no operator in the sense of a manual operator for a discharge valve, and thus this valve is not adapted to be used as a bottom discharge outlet.

SUMMARY OF THE INVENTION

It is an object of the present invention to provide a bottom discharge outlet having a shear plane whereby the lower portion of the outlet will shear off below the plug portion of the outlet upon impact to the housing, while maintaining the plug in seated position, thereby preventing the lading from escaping.

It is another object of the present invention to provide a bottom discharge outlet in which lower portions of the valve operating mechanism can be replaced, leaving the upper portion in place with lading in the tank.

It is another object of the present invention to provide a bottom operable valve assembly in which with the lading removed, the entire valve assembly can be removed from outside the tank without requiring the operator to enter the tank.

Another object of the present invention is to provide a bottom discharge outlet which has effective sealing to reduce or avoid lading leakage.

A bottom operable lading valve assembly for tank cars includes a valve body adapted to be integrally attached to an opening in the bottom of a tank. The valve body includes a valve body opening therein. A retainer is fitted within the valve body opening, including a flange portion and means for attaching the retainer to the valve body. The retainer includes at least one retainer rib extending radially inwardly from the flange portion and terminating in a retainer connection portion having a center hub. A valve closure plug is movable between open and closed positions relative to a circular plug seat located within the valve body opening. A housing is affixed to said valve body with fastening means comprising a shear plane. The housing includes a generally vertical housing opening therein into which a rotatable valve operator is mounted comprising a lower tool connection portion, a shaft portion and an upper operating portion. The center hub slidingly engages the upper operating portion to allow rotation of said valve operator, while maintaining said upper operating portion spaced from the valve body and vertically fixed. The upper operating portion includes upper operator threads which engage a valve plug operating stem depending from said valve plug having stem threads. The upper operating portion and valve stem terminate on or above the shear plane.

The valve operator includes separating means for separating the shaft portion of the valve operator at or below the shear plane in the event the housing should shear off along the shear plane. The valve plug includes at least one plug depending member or guide in addition to the stem, extending downwardly from the plug sufficiently far to engage the retainer rib when the plug is in open or closed position. The plug depending member is preferably movable to a position circumferentially spaced from the radially extending rib when the closure plug is in closed position. Thus during rotation of the valve operator in a direction to move the depending member into an engaged position with the retainer rib, the valve operator causes rotation of the closure plug, and the closure plug wipes the plug seat until the plug depending member assumes an engaged position with the retainer rib. This prevents further rotation of said plug, and rotation of the valve operator in a first direction in engaged position causes the plug to move vertically toward open position without rotation. Closure plug stop means engage when the plug assumes the completely open position. Rotation of the valve operator in open position in a second direction, opposite to said first direction, causes the plug to rotate until the plug depending member engages the rib, at which time further rotation of the plug ceases. Further rotation of the valve operator causes the plug to move vertically downwardly to a closed and seated position. It is to be noted that the valve operator is rotatable in closed position with said plug engaging said plug seat in the first direction to cause rotation of the plug and a wiping of the said plug seat by said plug.

Thus, when the closure plug is in closed position, severe impacts to the outlet will cause the housing and the shaft portion of the valve operator to separate from the outlet at or below said shear plane, and below the upper operator, valve stem and valve plug, thereby tending to maintain the valve plug in the closed, seated position and maintain lading within the tank during and after such impact.

A screen is preferably provided, extending up into the tank from the valve body to protect the valve assembly from loose objects located in the tank.

Preferably the lower portion of the operating assembly below the valve plug operator is removable for repair or replacement with lading in the tank. Preferably also, the entire valve opening assembly including the valve plug, the valve plug seat and the valve plug operator are removable for repair, replacement or cleaning, externally of the tank so that the operator will not have to enter the tank for this purpose.

THE DRAWINGS

FIG. 3 is a sectional view along the lines 3—3 in FIG. 1;

FIG. 4 is a sectional view along the lines 4—4 in FIG. 1;

FIG. 5 is a sectional view of another embodiment of the bottom outlet of the present invention with the plug in the closed position;

FIG. 7 is a sectional view along the lines 7—7 in FIG. 5;

FIG. 8 is a sectional view along the lines 8—8 in FIG. 5;

FIG. 9 is a sectional view along the lines 9—9 in FIG. 5;

FIG. 10 is a sectional view of another embodiment of the bottom outlet of the present invention with the plug in closed position;

FIG. 11 is a sectional view of the bottom outlet shown in FIG. 10 with the plug in open position;

FIG. 12 is a sectional view along the lines 12—12 in FIG. 10.

FIG. 13 is a sectional view along the lines 13—13 in FIG. 10;

FIG. 14 is a sectional view along the lines 14—14 in FIG. 10;

DETAILED DESCRIPTION OF THE INVENTION

Figure 1:
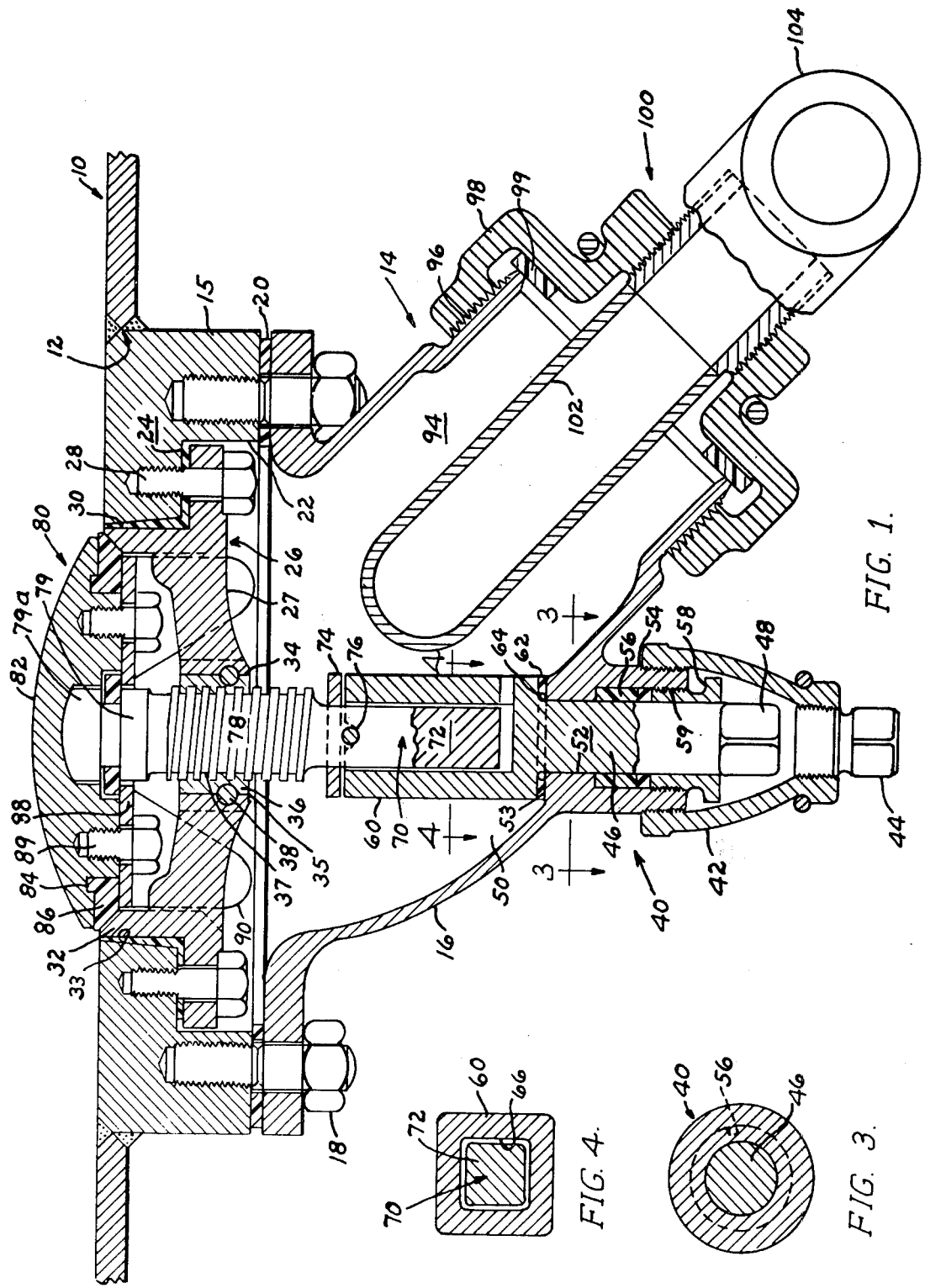
FIG. 1 is a sectional view of one embodiment of the bottom discharge outlet of the present invention with the plug in the closed position.

In accordance with one embodiment of the present invention, as shown in FIGS. 1-4, described in detail in U.S. Pat. No. 3,981,481, a tank car indicated generally at 10 has a bottom discharge opening therein 12. A bottom discharge outlet indicated generally at 14 is integrally mounted within opening 12, for example, by welding. The outlet 14 comprises a valve body 15. A housing 16 is removably mounted upon valve body 15 by means of fastening bolts 18. A seal member 20 is provided therebetween. In some applications, the valve body may take the form of a tank car universal flange.

Valve body 15 has an inner opening indicated at 22, and a transverse shoulder 24. A retainer assembly 26 comprising a spider 27 is held in place against shoulder 24 by means of fastening bolts 28. A seal member 30 is provided therebetween. Spider 27 has a vertically extending portion 32 which extends into the smaller diameter opening 33 of valve body 15. Spider 27 has a centrally disposed opening therein 34. A stem nut 36 having threads 37 is provided in this opening and is held in place by retainer pins 38. Alternately a single U shaped member may be used instead of pins 38. If desired, the threads could be provided directly in spider 27.

An operating mechanism indicated generally at 40 is removably affixed to housing 16. This operating mechanism may comprise a closure cap 42 which threadedly engages housing 16. An outlet valve cap 44 may be provided which threadedly engages closure cap 42. A vertically extending operator 46 is provided with a connecting portion 48 adapted to be engaged by a wrench or appropriate tool to rotate operator 46.

Housing 16 is provided with an opening 50 which preferably is of reduced diameter as indicated at 52 and enlarged diameter as indicated at 54. A seal or packing 56 may be provided in the enlarged portion 54 which is held in place by a packing gland nut 58 which threadedly engages housing 16 at 59.

Operator 46 is preferably circular as shown in FIG. 3 for rotation within housing 16 and is provided with a square cross section extension 60 as shown in FIG. 4. Extension 60 sits upon a shoulder 53 defined by housing 16. A thrust washer 62, for example, made of halogenated polyethylene, such as tetrafluoroethylene, is provided on shoulder 53 and a conventional O-ring seal 64 is also provided. Extension 60 is provided with a hollow portion or opening 66 into which an upper valve operator indicated generally at 70 is inserted. Upper operator 70 comprises a portion 72 having square cross section adapted to be engaged by extension 60. A stop washer 74 held in place by a stop pin 76 is provided on the valve operator above portion 72.

Upper valve operator 70 is threaded as indicated at 78 and threads 78 are adapted to engage cooperating threads 37 provided within stem nut 36. Operator 70 is provided with a shoulder 79 and a head 79a adapted to engage a valve plug indicated generally at 80. Valve plug 80 may comprise a plug member 82 generally hemispherical having openings therein 84 into which are affixed a valve seat seal 86. Seal 86 is held in place by a gasket retainer plate 88 which has mounted integral therewith either by welding or appropriate fasteners valve guides 90. Seal member 86 positively engages a plug seat formed on the vertical extension 32 of spider 27 upon rotation of operator 70 by operator 46 to insure a good seal in the closed position.

Housing 16 is provided with a second opening 94 and a threaded portion 96. An outlet cap 98 threadedly engages threads 96 and holds in place an outlet cap gasket 99. Means for heating lading which may have congealed in the valve outlet is indicated generally at 100 and may comprises a tubular member 102 having conduit structure attached thereto 104 for circulating a heating fluid, such as steam, for melting any congealed lading in the outlet assembly. In some applications it might be desired to cool the outlet, in which case cooling fluid may be passed through conduit structure 104 and tubular member 102.

Figure 2:
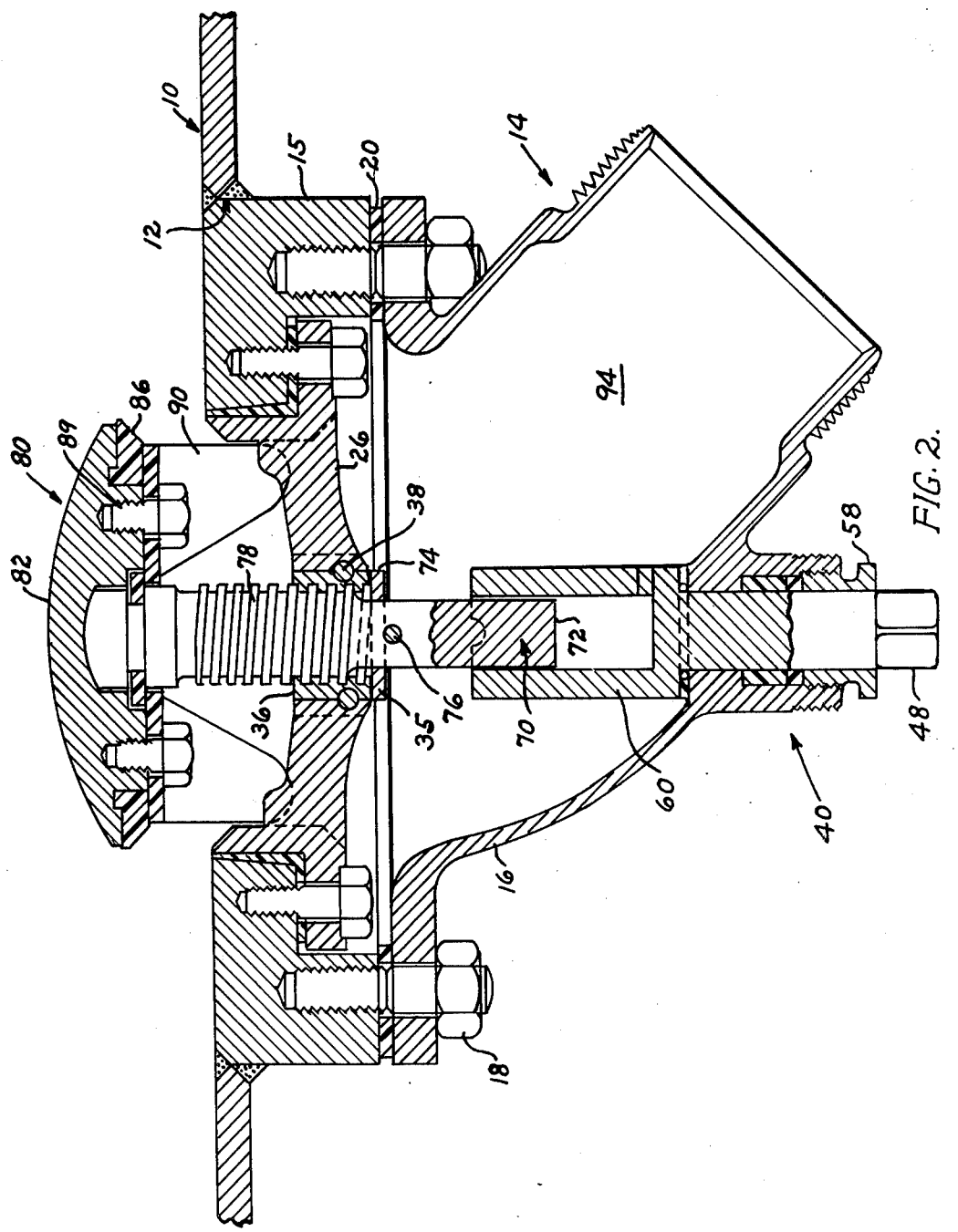
FIG. 2 is a view similar to FIG. 1 illustrating the plug in the open position.

In the operation of the apparatus shown in FIGS. 1–4, closure cap 42 is first removed allowing operation of the wrenching portion 48 by the operator. Rotation of wrenching portion 48 rotates extension 60 which in turn rotates operator 70 moving the same upwardly by means of threads 78 engaging threads 37 of the retainer assembly. Valve guides 90 insure that valve plug 80 will rise in a generally vertical manner and will not tend to become cocked or misaligned in the vertical movement. The fully open position is achieved when stop washer 74 engages the lower surface 35 of the retainer assembly (stem nut 36) as shown in FIG. 2.

Prior to the removal of closure cap 98 a heating fluid may be passed through conduit 102 to melt any congealed lading in this portion of the outlet assembly. The cap 98 is removed as shown in FIG. 2 and the lading discharged through opening 94.

It will be apparent that the valve arrangement of the present invention has considerable flexibility. Removal of bolts 18 allows removal of the housing 16, and operator assembly 40 including operator 46 and extension 60 with lading in the tank, in the event that one or more of these parts were damaged, preventing unloading of the lading. Removal of bolts 28 will allow removal of the entire remaining assembly without entering the tank, including upper valve operator 70, plug assembly 80 and retainer 27 including the plug seat formed on portion 32.

Thus the problem associated with prior outlets of the operator having to remove the outlet from inside the car after the car has been emptied is avoided by the arrangement of the present invention. Thus a considerable saving in labor and in tank downtime is achieved, with greater operator safety. Removal and replacement of damaged parts is readily achieved.

Another important advantage of the outlet of the present invention is the assembly provides for a shear plane in the event the outlet is impacted by derailment and/or hitting something in its path. One set of shear grooves is provided in threads 78 and another through seal 20 in bolts 18. Thus, if for example, the car is derailed and the outlet hits the ground it will readily shear off, leaving the valve plug 80 closed and in seated position so that it is unlikely that the lading will escape.

Another embodiment of the present invention is shown in FIGS. 5 and 8. The structure is similar to that shown in FIGS. 1 and 2 but the operating assembly is different.

Retainer assembly 126 comprises a spider 127 and a vertically extending guide 125 including an upper plug seat 125a. Fasteners 128 having a counter sunk head 129 are used to hold spider 127 in engagement with guide 125. Fasteners such as cap screws 28, hold the retainer assembly 126 including guide 125 and seal 30 within valve body 15.

Operator 46 is provided with a lower connection portion 48 and an operating extension 160 which engages an intermediate operator 162 of square cross section which has an expanded portion 164 having a square cross section which engages a cooperating portion 172 of an upper operator indicated generally at 170. Internal threads 174 of operator 170 engage external threads 137 in depending operator stem 136.

Fasteners 89 hold in place guide retainer plate 88, seal 86, depending operator 136, and depending guides 190.

Figure 6:
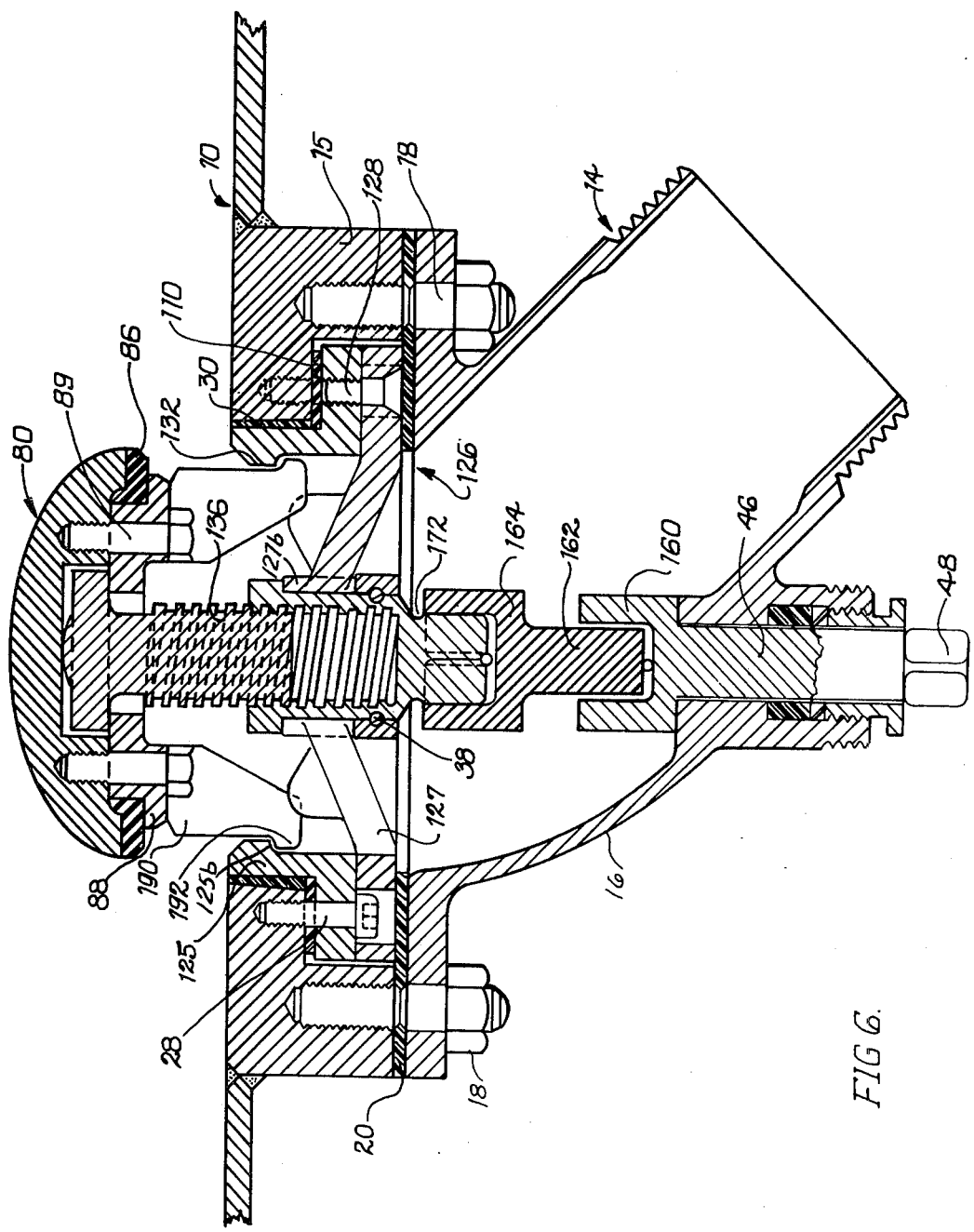
FIG. 6 is a view similar to FIG. 5 of this embodiment of the present invention illustrating the plug in the open position.
Figure 17:
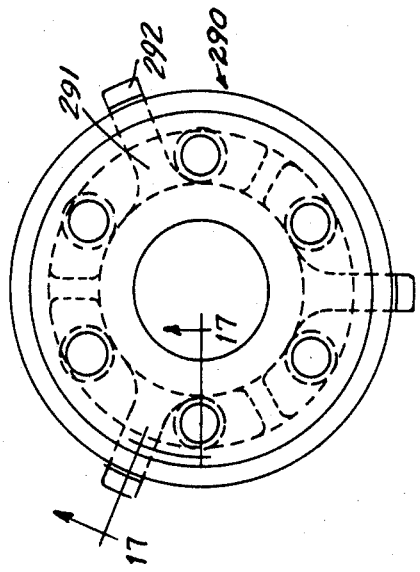
FIG. 17 is a plan view of the valve guide shown in FIGS. 10 and 11.

It will be apparent from the foregoing that the present invention comprises a bottom operable lading valve assembly 10 for tank cars including a valve body 15 adapted to be integrally attached to an opening in the bottom of a tank; a retainer 126 is fitted within valve body opening 15a including a flange portion 126a and fastening means 129 for attaching the retainer to the valve body. The retainer 126 includes at least one spider retainer rib 127 extending radially inwardly from the flange portion including lugs 127a and terminates in a retainer connection portion having a center hub 127b (FIG. 6). A valve closure plug 81 is movable between open and closed positions relative to a guide 125 having a circular plug seat 125a located within the valve body opening.

A housing 16 is affixed to valve body 15 with fasteners 18 comprising a shear plane 20. The housing includes a generally vertical housing opening 16a therein into which a rotatable valve operator 40 is mounted comprising a lower tool connection portion 48 of shaft portion 46-162 and an upper operating portion 172. Center hub 127b slidingly engages upper operating portion 172 to allow rotation of the valve operator while maintaining the upper operating portion spaced from valve body 15 and vertically fixed.

The upper operating portion includes upper operator threads 174 for engaging a valve plug operating stem 136 depending from said valve plug 81 having stem threads 137 which engage the upper operator threads 174. Stem 136 preferably terminates above shear plane 20. The valve operator shaft portion includes separating means, groove 173 and/or clearance 162a and/or 172a, for separating a portion of the valve operator below shear plane 20 in the event the housing should shear off along the shear plane 20.

The valve plug assembly 80 includes at least one plug depending member or guide 190 in addition to stem 136, extending downwardly sufficiently far to engage retainer lug 127a when the closure plug 81 is in open position (FIG. 6).

Plug depending member 190 is movable to a position circumferentially spaced from said rapidly extending rib 127 in closed position. Thus during rotation of said valve operator 40 in a direction to move closure plug 81 and depending member 190 into an engaged position with spider retainer ribs 127, the valve operator causes rotation of the plug 81, and closure plug seal 86 wipes plug seat 125a until plug depending member 190 assumes the engaged position with spider ribs 127, which prevents further rotation of the plug. Further rotation of said valve operator 46 in this direction causes the closure plug 81 to move vertically toward open position without rotation. In the full open position closure plug stop means engage. Catches 192 engage lugs 125b on guide 125 (FIG. 6). Rotation of the valve operator 46 in open position in a second direction, opposite to said first direction, causes said plug 81 to rotate until the plug depending members 190 again engage the spider ribs 127 at which time further rotation of said plug ceases. Further rotation of the valve operator causes the closure plug to move vertically downwardly to a closed and seated position. It is to be noted that valve operator 40 is rotatable in the above identified first direction when plug seal 86 engages a plug seat 125 to cause rotation of closure plug 81 and a wiping of the plug seat 125 by plug seal 86. The amount of wiping depends upon the amount of clearance between the plug depending member(s) and the retainer rib(s). See FIGS. 15-18 which illustrate this clearance relationship relative to FIGS. 10-14. The clearance considerations between depending members 190 and retainer ribs 127 are the same as illustrated in FIGS. 15-18. Wiping can be reduced or eliminated by reducing or eliminating this clearance.

When the closure plug is in closed position, severe impacts to said outlet will cause the housing and a portion of valve operator 46 to separate from said outlet on or below the shear plane 20, due to clearance 162a, 172a and/or groove 173, thereby tending to maintain said valve plug in the closed, seated position and maintain lading within the tank during and after such impact.

Housing 16 and operating assembly up to and including intermediate operator 162 may be removed and replaced with lading in the tank. Furthermore, spider 127 may also be removed with lading in the tank by removal of bolts 128 and pins or cap screws 38, and sliding the spider downwardly.

Valve guide 125, valve plug 81, depending operator 136 and gasket 86 remain in place. By removal of bolts 28, plug assembly 80, depending operator 136 and guide 125 including plug seat 125a may be removed from outside the tank, after the lading has been unloaded.

The valve plug assembly 80 can then be disassembled by removing fasteners 89.

Furthermore, shear grooves 20 along bolts 18 are maintained and a shear groove is provided at 173 in operator 170. Also as shown in FIG. 9, clearance is provided between intermediate operating portion 164 and upper operator portion 172. Thus, in the event of impact to housing 16, the housing will shear off along a plane between housing 16 and valve body 15. Furthermore, the lower operating portion 160 and 164 will drop off because of the clearance illustrated in FIG. 9. Alternatively, should the lower operators 160 and 164 not drop off, the upper operator will shear off along the shear groove provided at 173. Thus double protection is provided to prevent the valve plug 81 from becoming unseated and lading escaping as a result of such impact. A drain hole opening 173a is provided at the bottom of operator 170 to drain internally threaded cavity 174.

Another embodiment of the present invention is shown in FIGS. 10-18. In this embodiment the upper valve operator, valve stem and valve plug are mounted within the valve body. Thus these members do not depend downwardly sufficiently far to be readily sheared off in the event of impact to the outlet assembly.

In this embodiment the tank 210 is provided with an opening 211 into which is affixed by welding a valve body 212. This valve body is provided with a vertical opening 214 and a horizontal shoulder 216. Countersunk bolts 228 and fasteners 229 hold a seal member 230 between shoulder 216 and a retainer assembly 226 comprising a spider 227 and a guide 232 having a seat 232a and a transverse latch or catch 233. Spider 227 is provided with a plurality of ribs 231 which hold in place an upper operator 270. Operator 270 is provided with a connection portion 272 and a threaded body portion 273 which threadably engages a depending operating stem 279 from a valve plug assembly 280. Upper operator 270 is driven by a lower operator shaft 46 and an intermediate operator shaft 162. Stem 279 and upper operator 270 terminate on or above shear plane 220.

Fasteners 289 hold in place depending members 290 which in turn hold in place a seal member 286 adapted to engage seat 232a in closed position. Rotation of operator 40 by a tool connected at 48 causes initial wiping rotation of seat 232a until depending guide portions 291 engage spider ribs 231 to prevent rotation of plug assembly 280. Protrusions 292 on portions 291 engage catches 233 to limit travel of the valve plug assembly (FIG. 11) in the full open position.

Figure 18:
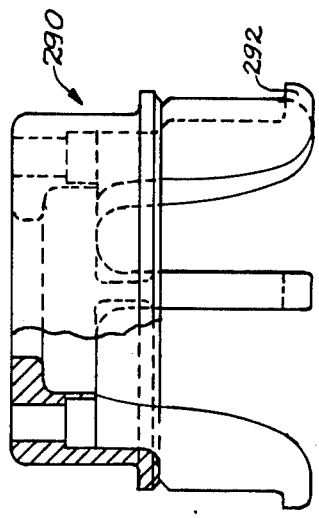
FIG. 18 is a view along lines 18—18 in FIG. 17.
Figure 15:
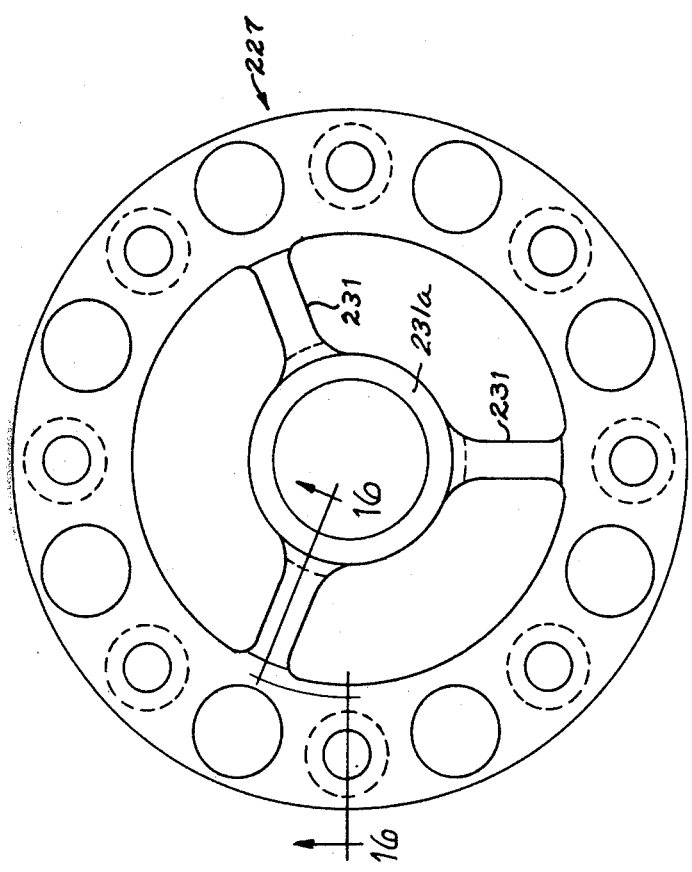
FIG. 15 is a plan view of the spider or guide shown in FIGS. 10 and 11.
Figure 16:
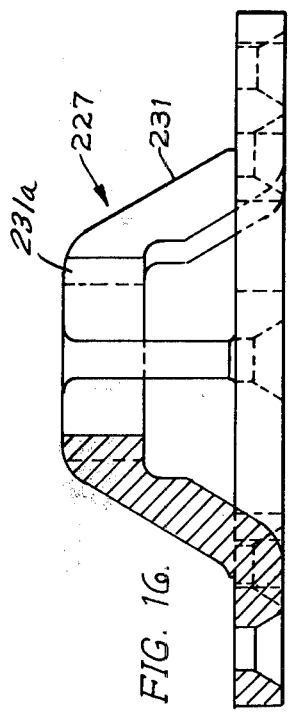
FIG. 16 is a view along lines 16—16 in FIG. 15.

Rotation of operator 40 in the opposite direction causes plug assembly 280 to rotate until depending guides engage opposite ones of retainer ribs 231 (FIGS. 15 and 18). After engagement, further rotation ceases and the closure plug assembly 280 descends to closed position. In closed position, operator 40 may be rotated in the first direction to cause a wiping of seat 232a by seal 286.

Clearance is provided between seal 230 and 232 and a means for preventing solid objects from contacting the valve assembly is provided therebetween indicated generally at 300. This may comprise a suitable screen 302 which extends above the height of valve plug 280 in the completely open position.

As shown in FIG. 14 clearance is provided between intermediate operator shaft 162 and upper operator 272. In the event that housing 16 is sheared off along the shear line between housing 16 and valve body 212, operator shaft 162 will drop off with the housing, leaving upper operator 270 and its connection portion 272 and valve stem 279 in place. The bottom of upper connection portion 272 and stem 279 are located above the shear line between housing 16 and valve body 212. Thus the car can be unloaded quickly by attaching a suitable tool to connect portion 272.

In the event that the operating shaft 162 does not drop off, the operator will shear off along shear groove 273a, providing dual protection to avoid the escape of lading.

Furthermore, the screen 302 prevents foreign material or foreign objects which may have been left in the tank from coming in contact with the valve operative elements and harming the operation thereof.

It is thus apparent that this embodiment is preferred insofar as the safety under impact or derailment is concerned, and insofar as protection from objects in the tank are concerned.

For repair or replacement the housing 16, lower operator 46 and intermediate operator 162 may be removed with lading in the tank. Spider 227 may also be removed by removing fasteners 229 and pins 38 (FIG. 1). After the lading has been removed screen 302, guide 232 and plug assembly 280 may be removed from outside the tank. After housing 16 has been removed, to assist in removing spider 227 and guide 232 downwardly, drain hole 273b may be threaded. A bar may then be extended between opposite body portion 212. A beveled fastener is threaded into opening 273b through an opening in the bar. As the fastener is tightened up against the bar, it exerts a pull on the operator 270 and retainer guide portion 232 should these portions be stuck in place.

In tests carried out in the laboratory of the assignee of the present application with a design similar to that shown in FIGS. 10–14, it was found that four (4) 5/16 inch bolts (Standard Grade 5) and four (4) 3/8 inch bolts (Standard Grade 5) on a 10⅜ inch bolt circle without shear grooves sheared off upon impact to the housing 9 7/16 inches and 3⅛ inches below the tank at a speed of 2½ miles per hour allowing the housing 16 to drop off. It was found, however, that when four (4) ¼ inch bolts (Standard Grade 5) on a 10⅜ inch bolt circle sheared off, at the same speed with an impact 9 7/16 inches below the tank the stress level in the tank bottom was of a level that yielding of the tank bottom was possible. Yielding was not observed.

Based on this testing standard grade bolts thinner than 5/16 inch are not believed strong enough to protect the housing from minor in-transit shocks which would not effect the tank or the valve plug in seated position. Standard bolts thicker than ¼ inch may be used if a shear groove is provided in the bolts.

We claim:

1. A bottom operable lading valve assembly for tank cars comprising:
a valve body adapted to be integrally attached to an opening in the bottom of a tank; said valve body having a valve body opening therein; a retainer fitting within said valve body opening, including a flange portion and means for attaching said retainer to said valve body, said retainer including at least one retainer rib extending radially inwardly from said flange portion and terminating in a retainer connection portion having a center hub; a valve plug movable between open and closed positions relative to a circular plug seat located within said valve body opening, a housing affixed to said valve body with fastening means comprising a shear plane; said housing having a generally vertical housing opening therein into which a rotatable valve operator is mounted comprising a lower tool connection portion, a shaft portion and an upper operating portion; said center hub slidingly engaging said upper operating portion to allow rotation of said upper operating portion while maintaining said upper operating portion spaced from said valve body and vertically fixed; said upper operating portion having upper operator threads for engaging a valve plug operating stem depending from said valve plug having stem threads which engage said upper operator threads; said upper operating portion and said stem terminating above said shear plane; said shaft portion including separating means for separating said valve operator shaft below said shear plane in the event said housing should shear off along said shear plane; whereby rotation of said valve operator in a first direction causes said plug to move toward open position; closure plug stop means which engage when said plug assumes the full open position; and whereby rotation of said valve operator in open position in a second direction, opposite to said first direction, causes said plug to move to a closed and seated position; and whereby when said closure plug is in closed position severe impacts to said outlet will cause said housing and a portion of said valve operator shaft to separate from said outlet generally below said shear plane, thereby tending to maintain said valve plug in the closed, seated position and maintain any lading within the tank during and after such impact.

2. A bottom operable lading valve assembly according to claim 1 wherein said depending member engages a portion of said retainer to prevent rotation of said valve plug.

3. A bottom operable lading valve assembly according to claim 1 wherein a seal is mounted upon said plug which engages said seat in closed position.

4. A bottom operable lading valve assembly according to claim 1 wherein said housing, said valve operator and said retainer are removable from said valve assembly with lading in the tank without moving said valve plug from the closed and seated position.

5. A bottom operable lading valve assembly according to claim 4 wherein said retainer includes a portion which is not removable with lading in the tank including said plug seat and wherein said plug engages said plug seat in closed position.

6. A bottom operable lading valve assembly according to claim 5 wherein said plug seat is located on a retainer guide located within said valve body opening and wherein said retainer guide, valve plug and depending plug operator are removable from outside the tank without requiring the operator to enter the tank for removal.

7. A bottom operable lading valve assembly according to claim 1 wherein said closure plug stop means comprise at least one catch on said depending member and a lug on said plug seat.

8. A bottom operable lading valve assembly according to claim 1 wherein said valve assembly includes a screen extending from said valve body up into the tank to protect said valve assembly from loose solid objects in the tank.

9. A bottom operable lading valve assembly for tank cars comprising:

a valve body adapted to be integrally attached to an opening in the bottom of a tank; said valve body having a valve body opening therein; a retainer fitting within said valve body opening, including a flange portion and means for attaching said retainer to said valve body, said retainer including at least one retainer rib extending radially inwardly from said flange portion and terminating in a retainer connection portion having a center hub; a valve plug movable between open and closed positions relative to a circular plug seat located within said valve body opening, a housing affixed to said valve body with fastening means comprising a shear plane; said housing having a generally vertical housing opening therein into which a rotatable valve operator is mounted comprising a lower tool connection portion, a shaft portion and an upper operating portion; said center hub slidingly engaging said upper operating portion to allow rotation of said upper operating portion while maintaining said upper operating portion spaced from said valve body and vertically fixed; said upper operating portion having upper operator threads for engaging a valve plug operating stem depending from said valve plug having stem threads which engage said upper operator threads; said upper operating portion and said stem terminating above said shear plane; said shaft portion including separating means for separating said valve operator shaft below said shear plane in the event said housing should shear off along said shear plane; said valve plug having at least one plug depending member in additon to said stem extending downwardly sufficiently far to engage said rib when said plug is in open and closed positions, whereby during rotation of said valve operator in a first direction to move said plug from closed to open position, said depending member assumes an engaged position with said rib, which prevents rotation of said plug; and whereby rotation of said valve operator in a first direction causes said plug to move vertically toward open position without rotation; closure plug stop means which engage when said plug assumes the full open position; and whereby rotation of said valve operator in open position in a second direction, opposite to said first direction, causes said plug to engage one of said ribs, and whereby rotation of said valve operator causes said plug to move vertically downwardly to a closed and seated position without rotation; and whereby when said closure plug is in closed position severe impacts to said outlet will cause said housing and a portion of said shaft portion to separate from said outlet generally below said shear plane, thereby tending to maintain any lading within the tank during and after such impact.

10. A bottom operable lading valve assembly according to claim 9 wherein said housing, said lower valve operator, said main valve operator and said retainer are removable from said valve assembly with lading in the tank without moving said plug from said plug seat.

11. A bottom outlet according to claim 10 wherein said separating means includes clearance between said upper connecting portion and said main operator tool connection portion whereby said lower operator will drop off in the event said housing shears off along said shear plane.

12. A bottom outlet according to claim 11 wherein said separating means includes a shear groove in said lower valve operator located on or adjacent to said shear plane.

13. A bottom operable lading valve assembly according to claim 11 wherein said plug seat is located on a retainer guide located within said valve body opening and wherein said retainer guide, valve plug and depending plug operator are removable from outside the tank without requiring the operator to enter the tank for removal.

14. A bottom outlet according to claim 11 wherein said clearance comprises a square opening between said upper operating portion and said main operator tool connection portion.

15. A bottom outlet according to claim 9 wherein fasteners hold said depending member and a seal in engagement with said plug.

16. A bottom operable lading valve assembly according to claim 9 wherein said valve operator is rotatable in said first direction when said plug engages said plug seat to cause rotation of said plug and a wiping of the said plug seat by said plug.

17. A bottom operable lading valve assembly for tank cars comprising:

a valve body adapted to be integrally attached to an opening in the bottom of a tank; said valve body having a valve body opening therein; a retainer fitting within said valve body opening, including a flange portion and means for attaching said retainer to said valve body, said retainer including at least one retainer rib extending radially inwardly from said flange portion and terminating in a retainer connection portion having a center hub; a valve plug movable between open and closed positions relative to a circular plug seat located within said valve body opening; a housing affixed to said valve body with fastening means comprising a shear plane; said housing having a generally vertical housing opening therein into which a rotatable valve operator is mounted comprising a lower tool connection portion, a shaft portion and an upper operating portion; said center hub slidingly engaging said upper operating portion to allow rotation of said valve operator while maintaining said upper operating portion spaced from said valve body and vertically fixed; said upper operating portion having upper operator threads for engaging a valve plug operating stem depending from said valve plug having stem threads which engage said upper operator threads; said operating portion and said stem located above said shear plane; said shaft portion including separating means for separating a portion of said valve operator shaft below said shear plane in the event said housing should shear off along said shear plane; said valve plug having at least one plug depending member in addition to said stem extending downwardly sufficiently far from said plug to engage said rib when said plug is in open and closed positions, said plug depending member being movable to a position circumferentially spaced from said radially extending rib when said plug engages said seat; whereby during rotation of said valve operator in a direction to move said depending member into an engaged position with said rib, said valve operator causes rotation of said plug, and said plug wipes said plug seat until said plug depending member assumes said engaged position with said rib, which prevents further rotation of said plug; and whereby rotation of said valve operator in a first direction in engaged position causes said plug to move vertically toward open position without rotation, closure plug stop means which engage when said plug assumes the full open position; and whereby rotation of said valve operator in open position in a second direction, opposite to said first direction, causes said plug to rotate until said plug depending member engages said rib, at which time further rotation of said plug ceases, and whereby further rotation of said valve operator causes said plug to move vertically downwardly to a closed and seated position; and whereby when said closure plug is in said closed and seated position, severe impacts to said outlet will cause said housing and said shaft portion to separate from said outlet generally below said shear plane, and below said upper operator and below said stem, thereby tending to maintain said valve plug in the closed, seated position and maintain lading within the tank during and after such impact.

18. A bottom outlet according to claim 17 wherein the retainer includes a plurality of radially extending ribs and wherein said depending member includes a plurality of depending portions which engage said ribs as said plug moves between open and closed positions.

19. A bottom operable lading valve assembly according to claim 17 including a screen extending from said valve body up into the tank to protect said valve assembly from loose solid objects located in the tank.

* * * * *